United States Patent [19]
Mauer et al.

[11] Patent Number: 4,836,728
[45] Date of Patent: Jun. 6, 1989

[54] BLIND-RIVETING ASSEMBLY

[75] Inventors: Dieter Mauer, Lollar; Wolf Renner, Giessen, both of Fed. Rep. of Germany

[73] Assignee: Emhart Industries, Inc., Farmington, Conn.

[21] Appl. No.: 110,643

[22] Filed: Oct. 15, 1987

Related U.S. Application Data

[63] Continuation of Ser. No. 898,770, Aug. 14, 1986, abandoned, which is a continuation of Ser. No. 671,327, Nov. 14, 1984, abandoned.

[30] Foreign Application Priority Data

Nov. 15, 1983 [DE] Fed. Rep. of Germany ....... 3341408
Nov. 15, 1983 [DE] Fed. Rep. of Germany ... 8332902[U]

[51] Int. Cl.$^4$ .................... F16B 13/04; F16B 13/06
[52] U.S. Cl. ......................................... 411/43; 411/70
[58] Field of Search .................. 411/34, 35, 36, 37, 411/43, 70, 501, 15; 10/27 PH

[56] References Cited

U.S. PATENT DOCUMENTS

| | | | |
|---|---|---|---|
| 2,195,029 | 3/1940 | Hathorn | 411/34 |
| 2,344,128 | 3/1944 | Cherry et al. | 411/70 |
| 2,545,752 | 3/1951 | Singelton | 411/43 |
| 2,576,624 | 7/1956 | Austin | 411/43 |
| 2,652,741 | 9/1953 | Ketchum | 411/43 |
| 2,691,915 | 10/1954 | Cherry | 411/43 |
| 3,230,818 | 1/1966 | Siebol | 411/34 |
| 3,534,419 | 10/1970 | Deans et al. | 411/34 X |
| 3,709,088 | 1/1973 | Pitzer | 411/70 |
| 4,293,258 | 10/1981 | McKennan | 411/34 X |

FOREIGN PATENT DOCUMENTS

| | | | |
|---|---|---|---|
| 2360159 | 6/1974 | Fed. Rep. of Germany | 411/34 |
| 252413 | 10/1948 | Switzerland | 411/43 |

*Primary Examiner*—Rodney M. Lindsey
*Attorney, Agent, or Firm*—Thomas S. Szatkowski

[57] ABSTRACT

A blind rivet assembly with a tubular rivet body having a flange at one end and a mandrel which projects from the rivet flange and can be pulled to set the rivet at its tail end. The mandrel has heads at both ends, one to set the rivet and the other to engage pulling means of the setting tool. The setting and pulling heads of the mandrel are rounded. The mandrel has a neck within the rivet at which it breaks when the rivet has been set. The invention enables a shorter mandrel to be used, and facilitates its economical manufacture without adversely influencing the characteristics of the breakneck. The invention also facilitates feeding of the assemblies automatically to rivet setting tools.

3 Claims, 1 Drawing Sheet

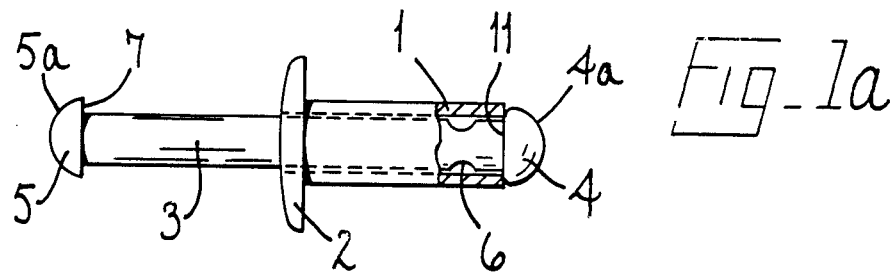
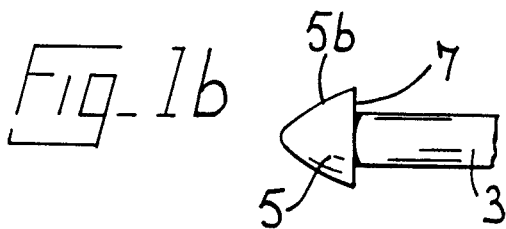
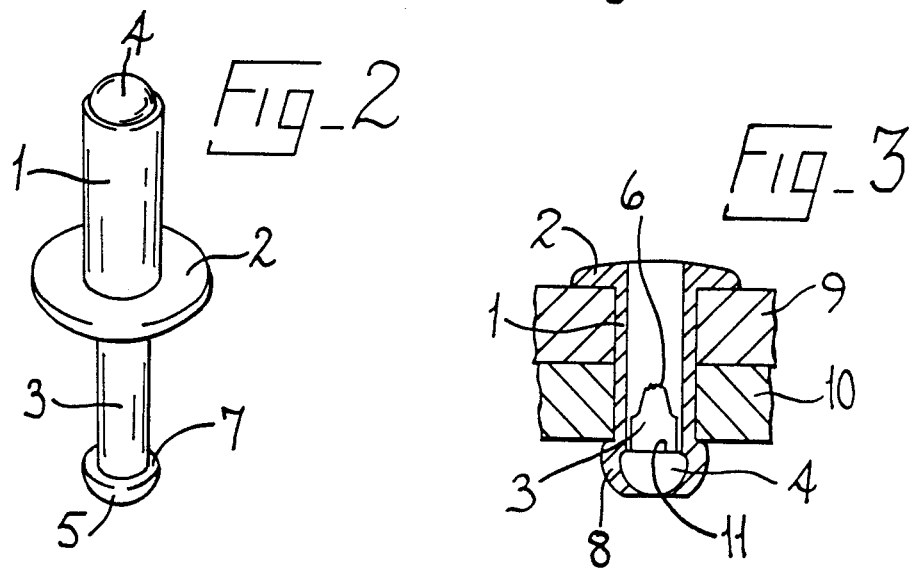
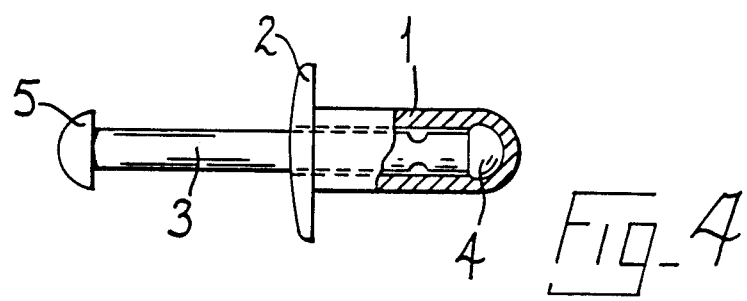

BLIND-RIVETING ASSEMBLY

This is a continuation of co-pending application Ser. No. 898,770, filed on Aug. 14, 1986, which is a continuation of Ser. No. 671,327, filed on Nov. 14, 1984, now both abandoned.

BACKGROUND OF THE INVENTION

1. Field of the Invention

This invention relates to a metal blind-riveting assembly comprising a rivet having a tubular body portion with a head flange at one end and a mandrel having a stem with a neck of reduced cross section at which the stem will break at a predetermined tension, the mandrel being upset at both ends, one of which forms a rivet-setting head while the other is a pulling head for engagement by pulling means of a rivet-setting tool.

2. Statement Of The Prior Art

A blind-riveting assembly of this general type, and its production method, are shown in U.S. Pat. No. 2,317,360. In this latter assembly there are two upset ends of the mandrel which are cylindrical, or substantially so, which with their greater diameters, are shouldered in relation to the part of the stem lying between them. The terminal end of each of the two heads remote from the mandrel stem is defined by a flat radial surface normal to the axis of the mandrel. The head used as the pulling head of the mandrel also meets the mandrel stem at an annular face normal to the mandrel axis, while the head forming the rivet-setting head is conical at its underside where it joins the mandrel stem and forms an angle of about 45° with the mandrel axis. The cone is intended to widen the body portion of the rivet when the rivet is being set. The pulling head of the mandrel is thus rectangular, or substantially so, in axial section, while at the opposite end of the mandrel, there is a corresponding profile but with the exception that here the transition into the mandrel stem is conically formed. U.S. Pat. No. 2,183,543 and 2,538,623 also illustrate other types of rivet assemblies.

With the method described in those specifications for producing the pulling head of the mandrel, with its substantially rectangular profile, a considerable amount of pressure is necessary in order to make the material blank yield to form this profile shape, and the reaction to this pressure is taken at least in part by an abutment engaging the other end of the mandrel. Thus, in the course of this heading operation the predetermined breaking point or neck of the mandrel, where the cross section of the mandrel stem is reduced, as shown in FIGS. 8 and 9 of U.S. Pat. No. 2,183,543 and in FIGS. 1 and 3 of U.S. Pat. No. 2,538,623, is subject to a considerable load. If the neck is one in which there is a reduction of about 30% in the cross section, as known and commonly used in the art, then there is a risk that the parts of the mandrel meeting at the neck will shift against each other in such a way, in the event of a particularly high pressure in the upsetting process, that they will no longer lie axially aligned if the mandrel is not tightly enclosed at either side of the neck by a tool which prevents any lateral yielding of the parts of the mandrel at these localities. Over and above this, high axial pressures exerted on the neck may lead to such a compressive strain on it that its predetermined breaking force changes, which would deprive the blind-riveting assembly in question of its required properties and under certain circumstances would even prevent proper execution of the rivet-setting process.

The properties describecd above, on the part of the known blind-riveting assembly with a mandrel upset at both ends essentially like flat-topped cylinders, no doubt contributed to the situation whereby such a blind-riveting assembly has not become widely established in practice. The blind-riveting assembly predominantly used in practice consists of a smooth continuous nail-like mandrel with a predetermined breaking point or neck inside the rivet sleeve and a rivet-setting head which is generally conical or hemispherical in axial section terminating at a flat annular base, and no pulling head.

In other blind-riveting assemblies known in the art, the mandrel projects beyond the rivet flange in the usual way over a length which represents a multiple of the length of the rivet, and runs to a slender point. Behind this there is a bead formed on the mandrel, behing which the setting tool grips the stem and which partically absorbs the tensile forces exerted on the mandrel by the setting tool. In front of the bead, in the direction of the rivet head flange, the mandrel is roughened so as to increase the friction between its surface and the jaws of the setting tool, with the result that the tensile force exerted by the setting tool is absorbed firstly by the mandrel stem via its friction-increasing surface and secondly via the bead. According to this type of rivet assembly, the bead fullfils only the function of an additional safeguard, and does not absorb the full tensile force of the setting tool all on its own. The bead formed adjacent the pointed end of the mandrel makes it impossible to push the mandrel with the bead through the rivet when producing the blind-riveting assembly. The bead must therefore be initially shaped subsequent to the insertion of the mandel in the rivet, which is technically difficult, particularly in view of the mandel's pointed tip extending beyond the bead. In practice, therefore, the metal blind-riveting assemblies have been used with a smooth nail-like mandrel, upset at only one end to provide the rivet setting head, in which the length of the part projecting out of the rivet head flange represents a multiple of the length of the rivet, in order to provide the pulling jaws of the setting tool with a sufficiently long application surface for transmitting the tensile force.

In addition to the above, there are also known solutions to the problem of applying the tensile force, which amount to providing ring grooves on the mandrel in the area of the part projecting from the rivet flange, in such a manner that on this part of the mandrel there are no parts going beyond its stem diameter. When producing the blind-riveting assembly in question, a mandrel of this type can still be pushed into the rivent sleeve after forming the ring grooves.

The above-described developments show that the specialist field has long had the idea of improving the blind-riveting assembly from the point of view of its gripping surface for the setting tool. Now it should be borne in mind with regard to the technique of ring grooves on the mandrel that ring grooves of this type may under certain circumstances degenerate into an unwanted breaking point below the predetermined tensile strength of the neck. The same risk also applies, moreover, to the above mentioned blind-riveting assembly commonly used today, which possesses a smooth-surfaced nail-like mandrel and which, precisely because of this smooth surface, has to be gripped with a high contact pressure by the setting tool on the part projecting from the rivet head flange. Setting tools are usually equipped with serrated jaws, and the serrations are frequently sharp edged, and, because of the high pressure they exert, occasionally produce notch marks on th mandrel which create breaking points where the tensile strength is below that of the neck, thus causing the mandrel to break in the wrong place, as a result of which the setting process is not reliably carried out.

The patents hereinbefore referred to all describe blind-riveting assemblies of what are called the "open type", that is to say where the mandrel stem passe right through the rivet, its pulling stem projecting from the head flange of the rivet and its rivet-setting head exposed at the other end where its base engages the tail end of the rivet. The problem of providing for the pulling of the mandrel as hereinbefore discussed involves the same considerations, however, in the case where the rivet is closed at its tail end, and the setting head of the mandrel is wholly enveloped in the body portion of the rivet.

BRIEF SUMMARY OF THE INVENTION

It is the object of the present invention to provide an improved blind-riveting assembly of the kind with an upset head on both ends of a break stem mandrel, which can be made in the known way involving subjecting a necked portion of the mandrel stem to axial pressure when upsetting the pulling head, but with minimal risk of interference with the configuration of the mandrel at the locality of its predetermined breaking point.

The invention provides a metal blind-riveting assembly comprising a rivet having a tubular body portion with a head flange at one end and a mandrel havin a stem with a neck of reduced cross section at which the stem will break a predetermined, tension, which neck lies within the body portion of the rivet, the mandrel being upset at both ends, one of which forms a rivet-setting head while the other is a pulling head for engagement by pulling means of a rivet-setting tool, and both the pulling head and rivet-setting head of the mandrel having an end face which is arch-shaped in axial section and terminates at a flat annular base facing the mandrel stem.

The foregoing design of the pulling and setting heads of the mandrel of an assembly in accordance with the invention results in a lower degree of deformantion being required on the part of the material of the mandrel when upsetting the pulling head. If the mandrel end face is arch-shaped in axial section, (i.e. the face is hemispherical, conical, pyramidal, frust-conical or frusto-pyramidal, for example) and terminates at a flat annular base where it joins the mandrel stem, or in other words is reduced in transverse cross sectional area progressively from its annular base. This special shape of the two upset heads of the mandrel of an assembly in accordance with the invention requires a correspondingly lower pressure in the course of shaping, especially since the specified contour, preferably rounded and most conveniently hemispherical, facilitates this shaping. It is thus possible to avoid adversely affecting the predetermined breaking point of the neck of the mandrel in terms of its position and properties, and it can therefore lie within the rivet where the adjacent parts of the mandrel itself are not given any particularly stable lateral support, such a support being precluded by the relative flexibility of the material of the rivet. Nor is the predetermined breaking point so loaded, by the pressure in the course of upsetting the pulling head, that its properties are thereby changed.

Furthermore, because the rivet-setting head, whether or not of the same size or shape as the pulling head, by having a flat annular base, it is ensured that this annular base, during setting, initially clinches the rivet sleeve in the desired annner, in order to fill satisfactorily the respective openings of the parts being joined. When, however, the rivet-setting head, is initially outside the rivet, the respective tail end of the body portion of the rivet bulges, and the head is partially drawn into the latter. This means that because of the flat annular base of the rivet-setting head, the adjacent part of the rivet sleeve partially closes again behind the setting head and thus holds the latter after the mandrel has broken.

Furthermore, the specified configuration of the pulling head of the mandrel of an assembly in accordance with the invention, namely its arch shaped outline in axial section, produces the effect of improving the sliding properties of the blind-riveting assembly when it is automatically fed into and through tubes or pipes, pulling head foremost. Moreover, if heads of the specified shape are at both ends of the mandrel of an open type blind-riveting assembly, both can serve as guide heads so that whichever is leading, the assembly has little tendency to catch anywhere in the guide duct. The shape of the pulling head of the mandrel of an assembly in accordance with the invention thus has a combined effect in both improving the reliability of manufacturing a product with predictable performance and improving the readiness with which it can be fed automatically. Such shape also facilitates inserting, automatically or by hand, the mandrel axially into a nose-piece and pulling device of a rivet-setting tool.

Because a mandrel with a pulling head can be pulled positively by a pulling device of a rivet-setting tool in engagement with the pulling head, rather than by engagement of clamping jaws of the tool which require a comparatively long area of contact to create sufficient friction to withstand the setting load, the mandrel of an assembly in accordance with the invention can be significantly shorter than the smooth nail-like mandrels of conventional blind rivets. In particular, the pulling head is separated from the rivet head flange by a distance corresponding at most to roughly the length of the rivet, that is to say of both the body portion and the head flange. This shortening of the mandrel entails firstly a considerable saving of material and secondly simplification of the removal of the broken-off part of the mandrel stem. This broken-off part of the mandrel stem has to be led away from the tool, and where this involves it passing through a passage in the tool through which there is a flow of air to assist such removal, the pulling head both counteracts jamming and offers the current of air a suitable surface (its annular base) for propelling it along the passage. In addition the relatively short blind rivet can be fed through guide ducts which change direction through correspondingly small radii.

There now follows a detailed description, to be read with reference to the accompanying drawings, of a blind riveting assembly in accordance with the invention and illustrative thereof. It will be realized that this illustrative assembly has been selected for description by way of example and not of limitation of the invention.

BRIEF DESCRIPTION OF THE DRAWINGS

FIG. 1a respresents the illustrative blind-riveting assembly in side view and partly in section;

FIG. 1b represents a modification of a pulling head of the illustratvie blind-assembly;

FIG. 2 shows the illustrative blind-riveting assembly of FIG. 1 in perspective;

FIG. 3 shows the illustrative blind-riveting assembly of FIG. 1 after setting of the rivet sleeve; and FIG. 4 represents a closed-ended variant of the illustrative blind-riveting assembly.

DESCRIPTION OF THE PREFERRED EMBODIMENT

The metal blind-riveting assembly shown in FIG. 1a consists of a tube-shaped rivet body portion or sleeve 1 with a rivet head flange 2 and a mandrel 3 with a rivet-setting head 4 upset at one end and a pulling head 5 upset at the other; the pulling head 5 has roughly the same diameter as the setting head. The pulling head 5 is arch-shaped in axial section, or more particularly, exhibits a semi-circular profile 5a. The mandrel 3 is provided with a predetermined breaking point or neck 6 where its stem is reduced in cross-section. The neck 6 lies within the rivet sleeve 1. The rivet 1, 2 and mandrel 3, 4, 5 are both made of metal, the material of the mandrel exhibiting a higher strength than the material of the rivet. The pulling head 5 serves for engaging pulling means of a setting tool (see for example U.S. Pat. No. 2,183,543).

As can be seen, the mandrel 3 is upset at both ends to form the rivet-setting head likewise 4 having a semi-cylindrical profile 4a and the end 5 serving as a pulling head. Both upset ends 4 and 5 undergo transition into the mandrel 3 with a flat annular base 11 or 7 normal to the axis of the mandrel and meeting the mandrel stem at a sharp corner. The base 7 thus forms a particularly favorable contact surface for the application of a setting tool, from which it cannot slip even if considerable tensile force is applied. The distance between the rivet flange 2 and the pulling head 5 is here roughly equal to the length of the rivet 1; thus the blind-riveting assembly shown in FIG. 1 is overall considerably shorter than the usual commercial blind-riveting assemblies with smooth nail-like mandrels, insofar as the mandrel 3 does not project so far out of the rivet flange 2 as is customary.

The pulling head of the mandrel of the illustrative assembly has been shown in FIG. 1a as hemispherical at its end face 5a with a flat annular base 7. The mandrel of an assembly in accordance with the invention may have a pulling head with other arched shapes as viewed in longitudinal section, and in particular may be conical or frusto-conical as depicted in FIG. 1b, or may be at least part pyramidal; in either case, it is preferably rounded, at least at its tip, and it is preferred to retain the flat annular base. It is not essential that the rivet-setting head 4 is of the same size or configuration as the head 5, the head 4 serving a different function and being designed with its intended purpose in mind. If the rivet 1 is open-ended with the setting head 4 of the mandrel exposed and engaging the tail end of the rivet as shown in FIG. 1a, a similar shape to the head 5 may be preferred, with a flat annular base 11 and an end face correspondingly arch shaped (e.g. curved or tapering) in longitudinal cross section. The head 4 may, in the case of a blind-riveting assembly of the closed ended variety, be wholly enveloped in the metal of the rivet at its tail end, as depicted in FIG. 4; in this case also, the setting head, while also arch-shaped in axial section, may be of smaller diameter than the pulling head.

In the two cases shown in FIGS. 1a and 1b, therefore, the upset ends 4 and 5 of the mandrel have a profile reducing in cross section from a flat base in a plane normal to the mandrel axis.

FIG. 2 represents the metal blind-riveting assembly according to FIG. 1a in a perspective view. This clearly shows the base 7 which runs radially to the mandrel 3, and forms the flat engagement surface for a setting tool. FIG. 3 shows the blind-riveting assembly of FIG. 2 in longitudinal section after setting of the rivet. Here the rivet sleeve 1 connects two plate-like components 9 and 10, by measn of the rivet flange 2 and the counter head 8, which is formed by widening the rivet sleeve by means of the setting head 4 in the known way. In this method the setting head 4, by virtue of its flat base, is partially surrounded by the counter head 8, so that it cannot fall out of the latter. Inside the rivet sleeve 1, the mandrel 3 ends where it has broken at the neck 6.

We claim:

1. A metal blind-riveting assembly comprising a rivet having a tubular body portion with a head flange at one end and an opposite end adapted to be deformed when the rivet is set and a mandrel having a stem of uniform cross section with a neck of reduced cross section at which the stem will break at a predetermined tension, which neck lies within the body portion of the rivet, the mandrel being upset at both ends, one of which forms a rivet-setting head while the other is a pulling head for engagement by pulling means of a rivet-setting tool, said pulling head being spaced from the rivet flange a distance substantially equal to the length of the rivet, and both the pulling head and rivet-setting head of the mandrel are of larger diameter than the diameter of the mandrel therebetween and each having an end face which is hemispherical and which terminates at a flat annular base facing the mandrel stem, said annular base joining said mandrel stem at a sharp corner, said rivet setting head having a diameter the same as that of said pulling head and being adapted to be partially enclosed in said opposite rivet end when the rivet is set to be locked therein, said reduced neck being located adjacent said rivet setting head so as to lie within the confines of the rivet body when broken upon setting the rivet, said hemispherical pulling and rivet setting heads having improved sliding properties when the blind riveting assembly is automatically fed into and through tubes or pipes.

2. An assembly according to claim 1 in which the rivet is open ended and the setting head of the mandrel engages the open end of the rivet.

3. An assembly according to claim 1 in which the rivet is closed at one end, which envelopes the setting head of the mandrel.

* * * * *